(12) United States Patent
Weber et al.

(10) Patent No.: US 7,726,747 B2
(45) Date of Patent: Jun. 1, 2010

(54) LOCKING HYDRAULIC BRAKE SYSTEM (75) Inventors: John Weber, 42 Corncrib La., Levittown, NY (US) 11756; Steven Kennedy, Canterbury (NZ)

(73) Assignee: John Weber, Levittown, NY (US)

( * ) Notice: Subject to any disclaimer, the term of this patent is extended or adjusted under 35 U.S.C. 154(b) by 627 days.

(21) Appl. No.: 11/657,999

(22) Filed: Jan. 25, 2007

(65) Prior Publication Data
US 2008/0179943 A1 Jul. 31, 2008

(51) Int. Cl.
*B60T 8/32* (2006.01)

(52) U.S. Cl. .................. 303/137; 303/89; 303/9.64; 188/24.22

(58) Field of Classification Search ............... 303/137, 303/89, 9.64, 9.65, 191, 192; 188/24.22
See application file for complete search history.

(56) References Cited

U.S. PATENT DOCUMENTS

| 2,190,872 | A | * | 2/1940 | George et al. ............... 303/84.2 |
|---|---|---|---|---|
| 2,472,442 | A | * | 6/1949 | Schueler ...................... 74/489 |
| 2,803,425 | A | * | 8/1957 | Little .......................... 251/257 |
| 2,813,603 | A | * | 11/1957 | Balass ......................... 477/197 |
| 3,546,960 | A | * | 12/1970 | Masuda ........................ 74/489 |
| 3,948,361 | A |  | 4/1976 | Carlson |
| 4,041,798 | A |  | 8/1977 | Shinozaki et al. |
| 4,457,562 | A | * | 7/1984 | Pickenhahn ................ 303/9.65 |
| 5,327,724 | A |  | 7/1994 | Tribuzio et al. |
| 5,857,385 | A |  | 1/1999 | Takeuchi |
| 6,450,301 | B1 |  | 9/2002 | Iizuka et al. |
| 7,584,826 | B2 | * | 9/2009 | Yamamoto .................. 188/2 D |
| 2006/0071542 | A1 |  | 4/2006 | Lichtensteiger et al. |
| 2006/0076197 | A1 |  | 4/2006 | Ishida |

FOREIGN PATENT DOCUMENTS

| JP | 411189189 | 7/1999 |
|---|---|---|
| JP | 2002-079981 | 3/2002 |
| JP | 2003-112684 | 4/2003 |

OTHER PUBLICATIONS

MPS Line Locks—web site: Http://www.mpsracing.com/products/MPS/Linelock.asp visited on Jul. 31, 2006; 2 pages.

* cited by examiner

*Primary Examiner*—Xuan Lan Nguyen
(74) *Attorney, Agent, or Firm*—Collard & Roe, P.C.

(57) ABSTRACT

A locking mechanism for installing between a master cylinder and a brake line includes a housing having an internal bore, an inlet port, a passage, and an outlet port. A reciprocating piston is movable within the bore. A locking lever is coupled to the reciprocating piston for actuating the reciprocating piston. A fastener having an internal fluid passage for providing fluid communication between the passage and the master cylinder secures the housing to the master cylinder. The locking lever is moveable between a first position, wherein the hydraulic fluid can flow freely between the master cylinder and the brake line for engaging and disengaging the vehicle brake and a second position, wherein the hydraulic fluid is prevented from returning to the master cylinder for maintaining the vehicle brake in an engaged state.

7 Claims, 7 Drawing Sheets

LOCKING HYDRAULIC BRAKE SYSTEM

BACKGROUND OF THE INVENTION

1. Field of the Invention

The invention relates to a locking hydraulic brake system. More particularly, the invention relates to locking mechanisms for installing between a master cylinder and a brake line. The invention further relates to a locking master cylinder assembly.

2. The Prior Art

Locking hydraulic brake systems or parking brakes according to embodiments of the invention may be used in various types of vehicles having hydraulically actuated brakes, for example automobiles, motorcycles, all-terrain vehicles and snowmobiles. A locking mechanism and a locking master cylinder assembly according to embodiments of the invention are particularly suited for use with a front or rear brake assembly of a motorcycle.

A motorcycle front brake system typically includes a hand-operated lever disposed on the right handlebar grip, along with the throttle. This lever operates a piston within a master cylinder assembly which is also secured to the right handlebar. Squeezing the brake lever forces hydraulic fluid from the master cylinder through a "banjo bolt" fitting and brake line to the front brake caliper to operate the brake. When the brake lever is released, the hydraulic fluid is allowed to flow back to the master cylinder, and the brake is released.

Existing motorcycle front brake systems generally do not include any type of locking mechanism, and accordingly when an operator is stopped on an incline, the operator must maintain pressure on the brake lever with his or her right hand to prevent the vehicle from rolling backward, while simultaneously twisting the throttle with the right hand to warm the engine. This is a difficult procedure and the motorcycle may roll backwards ("rollback") if not performed properly. Additionally, using the rear brake to hold the motorcycle has the disadvantage of requiring the operator to balance the bike with just one leg as the other foot must be used to depress the rear brake foot pedal used to actuate the rear brake.

A number of devices and systems for locking a brake on a vehicle such as a motorcycle, all-terrain vehicle or snowmobile are known. The following references, the disclosures of which are hereby incorporated by reference, relate to mechanisms for locking a vehicle brake in an engaged state.

U.S. Pat. No. 5,327,724 Tribuzio et al. shows a lockable master cylinder having a reversible electric motor for locking the piston in a rest or working position to keep the vehicle brake applied.

U.S. Patent Application Publication No. 2006/0076197 to Ishida, U.S. Pat. No. 6,450,301 to Iizuka et al. and corresponding Japanese Patent No. JP 2002/079981 A to Iizuka et al., each show a locking motorcycle rear brake system which requires an additional caliper to serve as a parking brake for the motorcycle rear wheel.

U.S. Pat. No. 3,498,361 to Carlson and U.S. Pat. No. 5,857,385 to Takeuchi describes devices for locking a lever which operate a cable-type mechanical brake.

U.S. Patent Application Publication No. 2006/0071542 to Lichtensteiger et al. shows a handlebar master cylinder assembly with a park pawl which engages a bracket connected to the master cylinder body to maintain the brake lever locked in an applied position. The park pawl flexes to compensate for hydraulic fluid temperature changes and maintain proper brake pressure.

Japanese Patent No. JP 411-189189 to Sekiya shows a parking brake device for a hydraulic motorcycle brake. The device has a sliding piston mounted in a cylinder adjacent the brake lever and an end of the piston contacts an end surface of the brake lever to set the parking brake.

Japanese Patent No. JP2003/112684 A to Igarashi shows a motorcycle parking brake with a brake lock lever mounted on the left handlebar for braking a drum brake of a motorcycle's rear wheel.

U.S. Pat. No. 4,041,798 to Shinozaki et al. shows a pawl and cam mechanism for locking a foot pedal which actuates a motorcycle rear brake.

The devices and systems for locking a vehicle brake as disclosed in the references cited above exhibit several deficiencies. In particular, the known systems are complicated and costly and are not easily adaptable to a vehicle's original equipment manufactured (OEM) braking system. Some of the known locking systems require additional brake calipers or electronics and solenoids. In addition, the known devices generally require substantial modification to a conventional vehicle brake system to implement.

Accordingly there exists a need for a simple and inexpensive locking brake mechanism which can be easily installed on an existing vehicle hydraulic brake system, such as a motorcycle front or rear brake system. Additionally, the need exists for a locking or parking system comprising a simple mechanical device which can be added to an existing motorcycle front or rear brake system as an aftermarket item or supplied as original equipment.

SUMMARY OF THE INVENTION

A locking mechanism for installing between a master cylinder containing hydraulic fluid and a brake line for operating a vehicle brake according to a first embodiment of the invention includes a housing which is secured to the master cylinder. The housing has an internal bore, an inlet port in fluid communication with the internal bore, a passage in fluid communication with the inlet port, and an outlet port in fluid communication with the internal bore and with the brake line.

A lid may be disposed on the housing and a reciprocating piston is disposed within the internal bore in a movable manner. A locking lever is coupled to the reciprocating piston for actuating the reciprocating piston. A portion of the locking lever may be in abutting contact with the reciprocating piston.

The housing is secured to the master cylinder with a fastener having an internal fluid passage for providing fluid communication between the passage in the housing and and the master cylinder.

The locking lever is moveable between a first, or unlocked position, wherein the hydraulic fluid can flow freely between the master cylinder and the brake line for engaging and disengaging the vehicle brake and a second, or locked position, wherein the hydraulic fluid is prevented from returning to the master cylinder for maintaining the vehicle brake in an engaged state.

A locking master cylinder assembly for supplying pressurized hydraulic fluid through a brake line to operate a vehicle brake according to another embodiment of the invention includes a housing having a reservoir for containing the hydraulic fluid. The housing has a first internal bore in fluid communication with the reservoir, a second internal bore, a passage for providing fluid communication between the first and second internal bore and an outlet port in fluid communication with the second internal bore and with the brake line.

A first reciprocating piston is movable within the first internal bore for pressurizing the hydraulic fluid to engage the vehicle brake in response to input from a vehicle operator.

A lid is disposed on the housing and a second reciprocating piston is disposed within the second internal bore in a movable manner. A locking lever for actuating the second reciprocating piston is pivotally coupled to the lid. A portion of the locking lever is in abutting contact with the second reciprocating piston.

The locking lever is moveable between a first, or unlocked position, wherein the hydraulic fluid can flow freely between the first internal bore and the brake line for engaging and disengaging the vehicle brake and a second, or locked position, wherein the hydraulic fluid is prevented from returning to the first internal bore for maintaining the vehicle brake in an engaged state.

A locking mechanism for remotely mounting between a first brake line coupled to a master cylinder containing hydraulic fluid and a second brake line coupled to a vehicle brake according to another embodiment of the invention includes a housing coupled to the first and second brake lines. The housing has an internal bore, an inlet port in fluid communication with the internal bore and the first brake line, and an outlet port in fluid communication with the internal bore and the second brake line;

A lid may be disposed on the housing and a reciprocating piston is movable within the internal bore. A locking lever is coupled to the reciprocating piston for actuating the reciprocating piston. A portion of the locking lever may be in abutting contact with the reciprocating piston.

The locking lever is moveable between a first, or unlocked position, wherein the hydraulic fluid can flow freely between the first brake line and the second brake line for engaging and disengaging the vehicle brake and a second, or locked position, wherein the hydraulic fluid is prevented from flowing between the first brake line and the second brake line for maintaining the vehicle brake in an engaged state.

An advantage of a locking mechanism or locking master cylinder assembly according to an embodiment of the invention is that it is simple to install and operate. A locking mechanism or locking master cylinder assembly according to an embodiment of the invention employs a simple mechanical valve design and does not require a solenoid, electronics, or extensive modification of the brake system, as do known brake lock devices.

Moreover, a locking mechanism or locking master cylinder assembly according to an embodiment of the invention has many advantageous uses, including preventing rollback when stopped on an incline, providing stability when the motorcycle is being transported by flatbed, van, truck or trailer, and eliminating the need to shut off the engine and put the motorcycle in gear to prevent rolling when dismounting the motorcycle, for example to open a garage door in order to store the motorcycle.

Another advantageous use of a locking mechanism or locking master cylinder assembly according to an embodiment of the invention is in performing a motorcycle stunt or trick known as a "burnout" by locking the front brake, revving the engine and quickly releasing the clutch.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
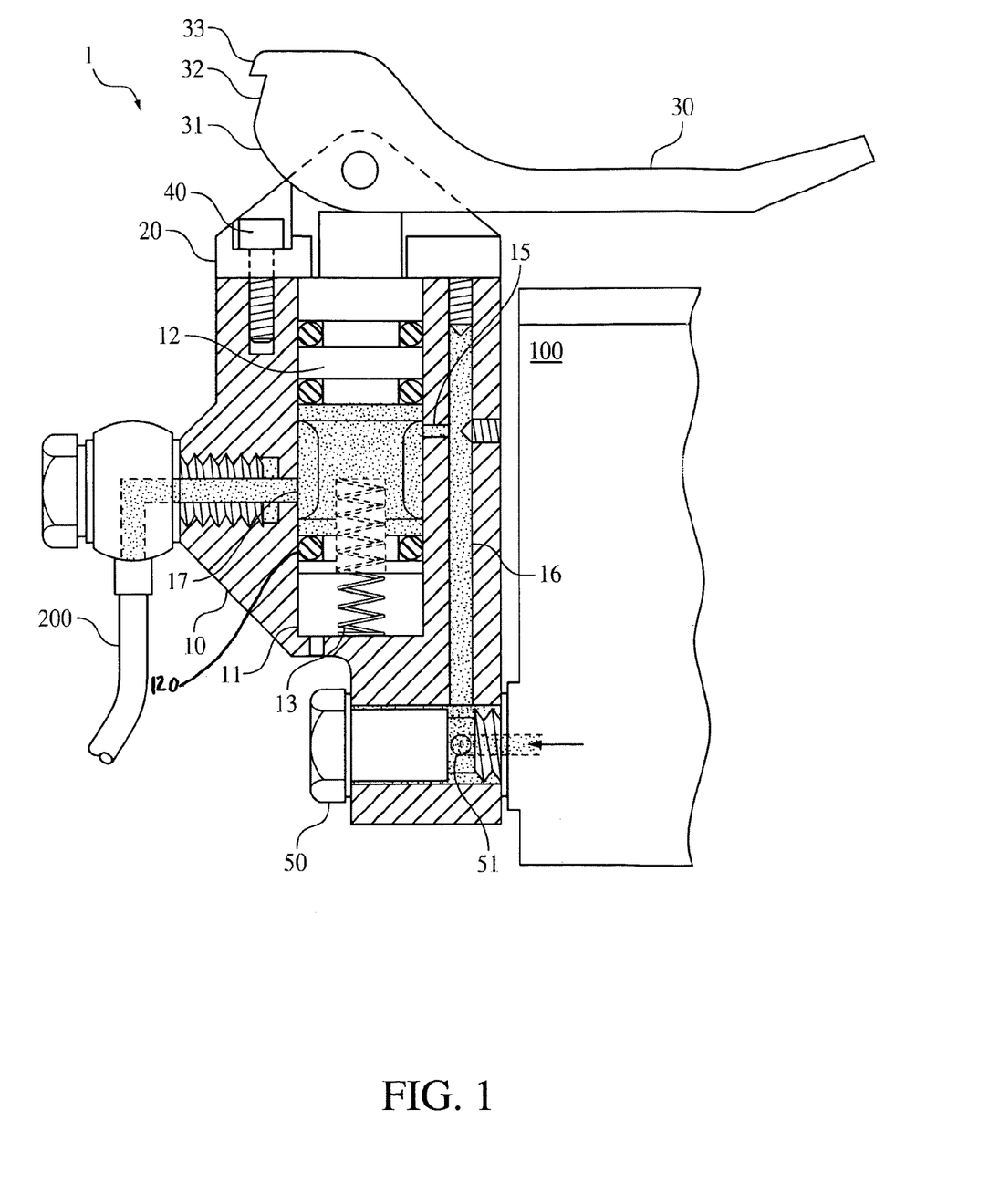
FIG. 1 shows a locking mechanism according to an embodiment of the invention with a locking lever in a first, or unlocked position.
Figure 2:
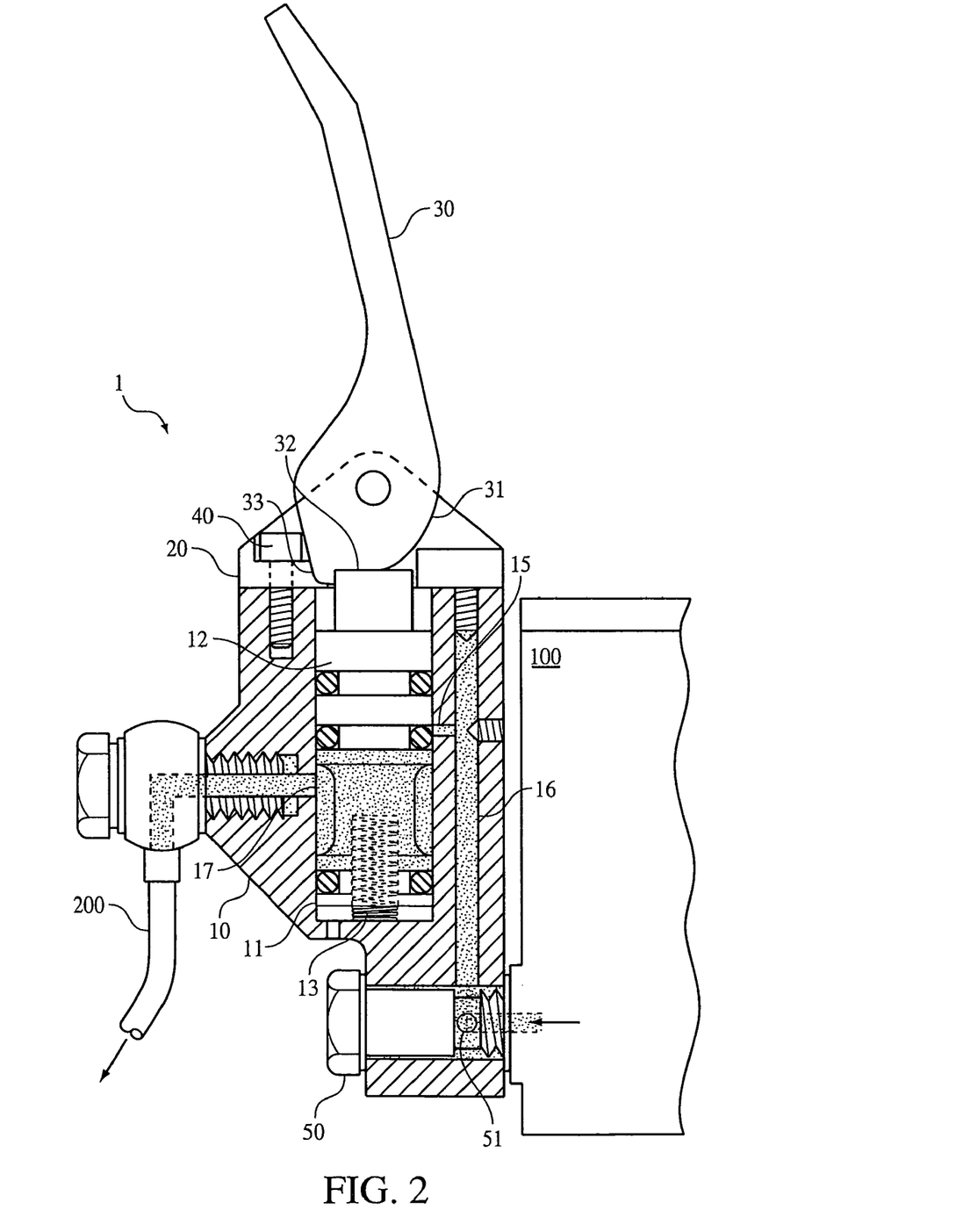
FIG. 2 shows the locking mechanism of FIG. 1 with the locking lever in a second, or locked position.

Referring now in detail to the drawings and, in particular, FIG. 1 shows a locking mechanism according to an embodiment of the invention with a locking lever in a first, or unlocked position. FIG. 2 shows the same locking mechanism with the locking lever in a second, or locked position. As shown, locking mechanism 1 may be installed between a master cylinder 100 containing hydraulic fluid and a brake line 200 for operating a vehicle brake.

Locking mechanism 1 includes a housing 10. Housing 10 may be constructed from metal, for example billet or cast aluminum, stainless steel, cast iron, magnesium or brass, from plastic or from any other suitable material. Housing 10 includes an internal bore 11. Internal bore 11 defines a movement space for a reciprocating piston 12. As shown, reciprocating piston 12 may comprise an upwardly biased member. A spring member 13 may serve as a biasing element for reciprocating piston 12. One or more sealing members, for example a ring-type seal 120 may be provided on reciprocating piston 12 for sealing piston 12 within bore 11.

Figure 3:
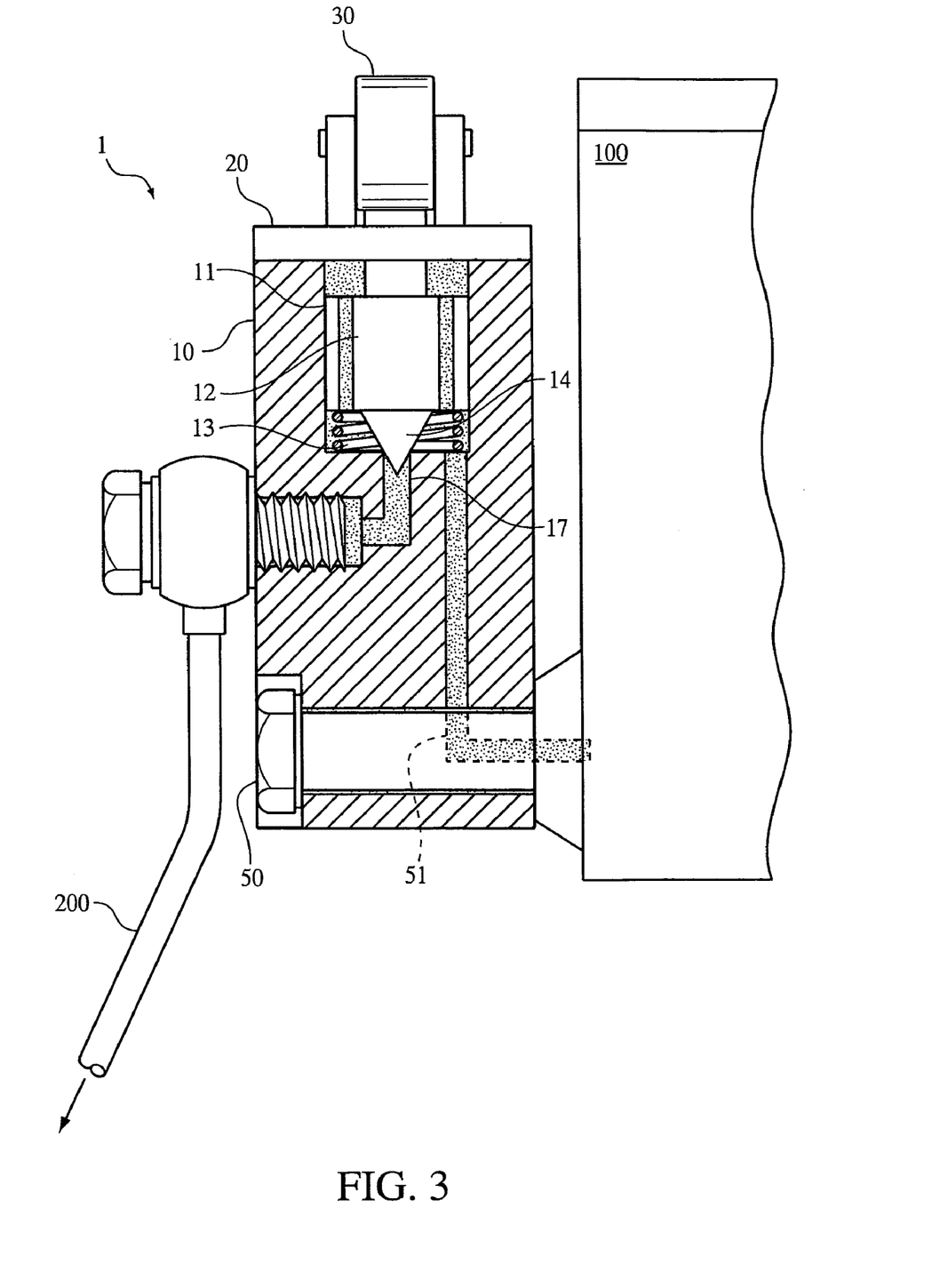
FIG. 3 shows a locking mechanism having a tapered conical seal according to another embodiment of the invention.

As shown in FIG. 3, reciprocating piston 12 may include a tapered conical seal 14, which along with reciprocating piston 12, bore 11 and housing 10 form a needle-type valve. Tapered conical seal 14 may comprise a rubber tip or other suitable material for forming a tight seal. Additionally, as shown in FIG. 3, the hydraulic fluid may be permitted to flow through passages or channels in reciprocating piston 12 to prevent unnecessary or excessive compression in the brake line when the locking mechanism is engaged.

Housing 10 further includes an inlet port 15 which is in fluid communication with internal bore 11, thereby allowing hydraulic fluid to flow between a passage 16 and the bore 11. An outlet port 17 is in fluid communication with the bore 11 and with the brake line 200, thereby allowing hydraulic fluid to flow between the brake line 200 and bore 11. Housing 10 may also include one or more breather ports for providing air pressure to the piston bore.

A lid 20 may be disposed on housing 10. Alternately, the mechanism may comprise a housing without a lid. Lid 20 may be fastened to housing 10 such that a seal is formed therebetween. For example an O-ring type seal or other appropriate sealing member may be used to provide a seal between lid 20 and housing 10.

A locking lever 30 for actuating reciprocating piston 12 is coupled to reciprocating piston 12. Preferably, locking lever 30 is pivotally coupled to lid 20. As shown, a portion of locking lever 30 may be in abutting contact with reciprocating piston 12 such that as locking lever 30 is pivoted, reciprocating piston 12 moves within internal bore 11. Preferably, locking lever 30 has a rounded camming surface portion 31, a flattened surface portion 32 and a projecting tab 33 for retaining locking lever 30 in a locked position as shown, for example, in FIG. 2.

Lid 20 may be secured to housing 10 using a plurality of fasteners 40, for example bolts or other suitable fasteners. Fasteners 20 may be inserted into opening provided in housing 10. Housing 10 may include a plurality of openings for receiving fasteners 40 such that lid 20 and locking lever 30 pivotally coupled thereto may be secured to housing 10 in a plurality of orientations. For example, lid 20 may be fastened to housing 10 using two lid bolts and housing 10 may include six openings for the lid bolts wherein the openings are positioned to allow lid 20 to be mounted in a number of orientations. In this manner, lid 20 with locking lever 30 can be rotated with respect to housing 10 to suit a particular application and/or operator.

Housing 10 is secured to the master cylinder 100 with a fastener 50. Fastener 50 includes an internal fluid passage 51 for providing fluid communication between passage 16 and an output port of the master cylinder. Fastener 20 may be, for example a banjo bolt which is similar to the fastener used to secure a brake line to a master cylinder. Preferably, fastener 50 is secured in an opening in master cylinder 100 previously used for securing brake line 200 using a banjo type bolt. In this way, locking mechanism 1 is adapted to be installed on a conventional mater cylinder assembly without any significant modifications. Locking mechanism 1 can be designed to be compatible with many types and makes of vehicles, for example motorcycle master cylinders supplied as original equipment by various manufacturers.

As shown in FIGS. 1 and 2, locking lever 30 is moveable between a first, or unlocked, position (FIG. 1), wherein the hydraulic fluid can flow freely between the master cylinder 100 and the brake line 200 for engaging and disengaging the vehicle brake and a second, or locked position (FIG. 2), wherein the hydraulic fluid is prevented from returning to the master cylinder 100. This second position maintains the vehicle brake in an engaged state keeping hydraulic pressure on the brake, while allowing the operator to release the brake lever or pedal used to engage and release the brake.

Locking lever 30 may be a hand-operated lever as shown in FIGS. 1-3, or alternatively a foot-operated lever. In addition a locking mechanism as described above may be secured to a master cylinder mounted to a vehicle handlebar, for example a motorcycle handlebar, or may be secured to a master cylinder mounted in any other location on a vehicle.

When locking lever 30 is in an unlocked position, for example the horizontal position shown in FIG. 1, hydraulic fluid can flow freely through the unit and the brake, for example a motorcycle front brake, can be operated in the usual manner, for example by squeezing a front brake lever. When locking lever 30 is in a locked position, for example the vertical position shown in FIG. 2, reciprocating piston 12 may be depressed and hydraulic fluid is prevented from returning to the master cylinder 100. This maintains pressure in the front brake line 200 and keeps the brake engaged.

In order to operate a locking mechanism or locking master cylinder according to an embodiment of the invention, a vehicle operator first applies pressure to the brake in the usual manner (for example by squeezing a motorcycle front brake lever or depressing a motorcycle rear brake foot pedal). Next, the operator engages the locking mechanism by moving a locking lever 30 to a locked position. To release the locking mechanism, the operator merely moves the locking lever 30 to its unlocked position, allowing the hydraulic fluid to flow back and releasing the pressure on the brake.

Figure 4:
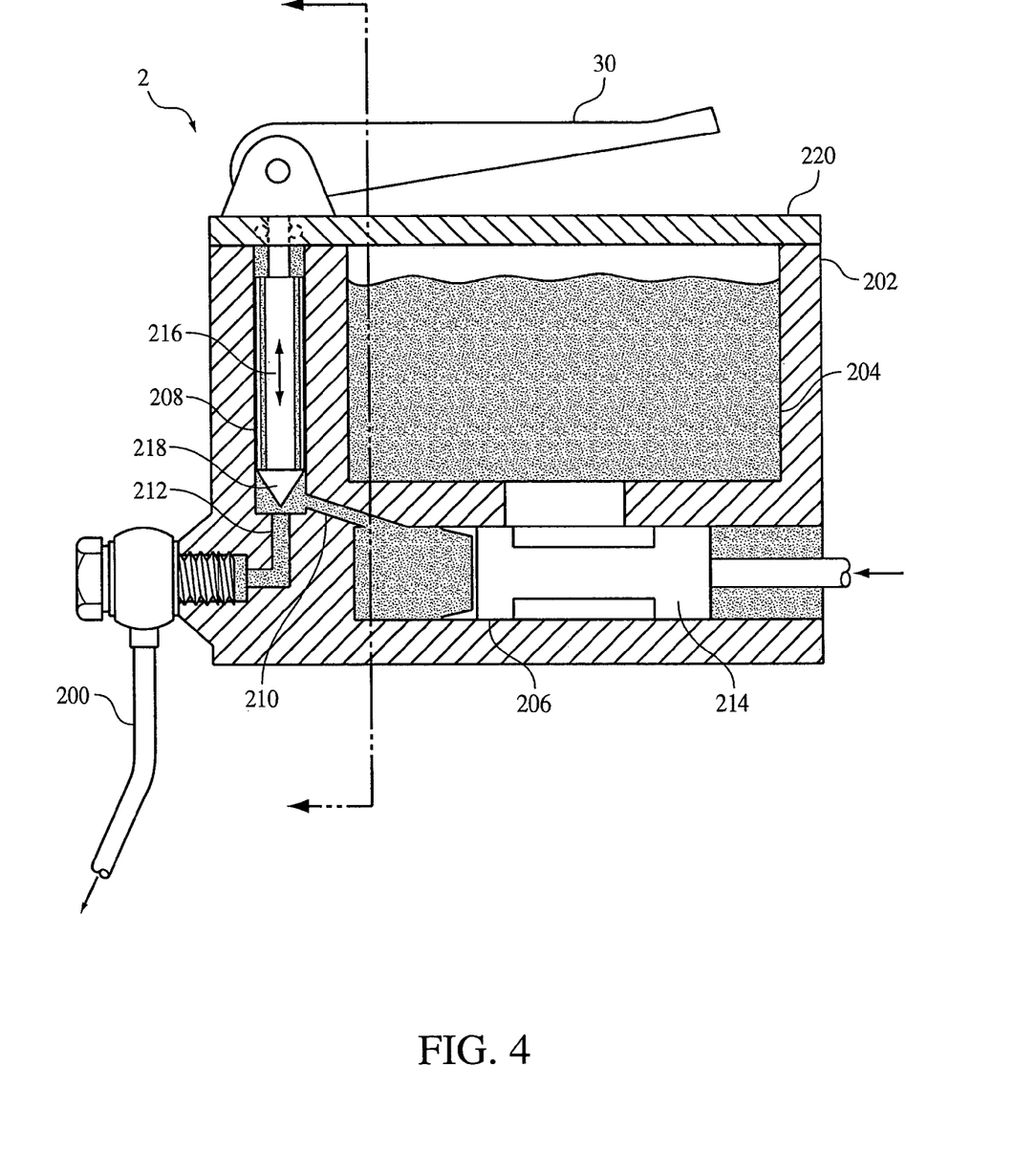
FIG. 4 shows a locking master cylinder assembly according to another embodiment of the invention.

FIG. 4 shows a locking master cylinder assembly 2 for supplying pressurized hydraulic fluid through a brake line 200 to operate a vehicle brake. The components on the right side of the dividing line in FIG. 4 may comprise a standard master cylinder setup, for example a handlebar mounted hand-operated motorcycle front brake master cylinder or a foot pedal operated motorcycle rear brake master cylinder. The components on the left side of the dividing line in FIG. 4 are added to the standard master cylinder setup to provide a means for holding pressure on the brake once and locking the wheel against rotation once the brake has been applied in the conventional manner by hand or foot pressure.

Locking master cylinder assembly 2 includes housing 202. A reservoir 204 for containing the hydraulic fluid is formed within housing 202. A first internal bore 206 in fluid communication with reservoir 204 and a second internal bore 208 are also disposed within housing 202.

A passage 210 is provided in housing 202 for providing fluid communication between first internal bore 206 and second internal bore 208. As shown, passage 210 may comprise a narrow channel extending between the two bore or chambers. An outlet port 212 in fluid communication with second internal bore 208 and brake line 200 is also disposed within housing 202.

A first reciprocating piston 214 for pressurizing the hydraulic fluid to engage the vehicle brake in response to input from a vehicle operator (indicated in FIG. 4 by an arrow pointing from right to left) is movable within first internal bore 206. This arrangement of first piston and bore may comprise an arrangement found in standard, non-locking master cylinder devices.

A second reciprocating piston 216 is disposed in housing 202 and movable within second internal bore 208. As shown, second reciprocating piston 216 may include a tapered conical seal 218, which along with second reciprocating piston 216, second internal bore 208 and housing 202 form a needle-type valve. Tapered conical seal 218 may comprise a rubber tip or other suitable material for forming a tight seal. Additionally, as shown in FIG. 4, the hydraulic fluid may be permitted to flow through passages or channels in second reciprocating piston 216 to prevent unnecessary or excessive compression in the brake line when the locking mechanism is engaged.

A lid 220 is disposed on housing 202. Lid 216 may be fastened to housing 202 such that a seal is formed therebetween. For example an O-ring type seal or other appropriate sealing member may be used to provide a seal between lid 220 and housing 202. A locking lever 30 for actuating second reciprocating piston 216 is pivotally coupled to lid. A portion of locking lever 30 may be in abutting contact with second reciprocating piston 216 such that as locking lever 30 is pivoted, second reciprocating piston 216 moves within second internal bore 208. Preferably, locking lever 30 has a rounded camming surface portion, a flattened surface portion and a projecting tab for retaining locking lever 30 in a locked position as shown, for example, in the lever illustrated in FIG. 2.

As in the previous embodiment, lid 220 may be secured to housing 202 using a plurality of fasteners, for example bolts or other suitable fasteners. Fasteners may be inserted into openings provided in housing 202. Housing 202 may include a plurality of openings for receiving fasteners such that lid 220 and locking lever 30 pivotally coupled thereto may be secured to housing 202 in a plurality of orientations. For example, lid 220 may be fastened to housing 202 using two lid bolts and housing 202 may include six openings for the lid bolts wherein the openings are positioned to allow lid 220 to be mounted in a number of orientations. In this manner, lid 220 with locking lever 30 can be rotated with respect to housing 202 to suit a particular application and/or operator.

Locking lever 30 is moveable between a first, or unlocked position, wherein the hydraulic fluid can flow freely between first internal bore 206 and the brake line 200 through outlet port 212 for engaging and disengaging the vehicle brake and a second, or locked position, wherein the hydraulic fluid is prevented from returning to the first internal bore for maintaining the vehicle brake in an engaged state. This second position maintains the vehicle brake in an engaged state keeping hydraulic pressure on the brake, while allowing the operator to release the brake lever or pedal used to engage and release the brake.

As shown, when locking lever 30 is in a first or unlocked position, hydraulic fluid is permitted to flow from reservoir 204 to first internal bore 206, from first internal bore 206 through passage 210, from passage 210 to second internal bore 208, and from second internal bore 208 out to brake line 200 via outlet port 212. In this state, the brake, for example a motorcycle front brake, can be operated in the usual manner, for example by squeezing a front brake lever. When locking lever 30 is in a locked position, second reciprocating piston 216 may be depressed and hydraulic fluid is prevented from returning to the first internal bore 206 This maintains pressure in the brake line 200 and keeps the brake engaged.

In order to operate a locking master cylinder assembly according to an embodiment of the invention, a vehicle operator first applies pressure to the brake in the usual manner (for example by squeezing a motorcycle front brake lever or depressing a motorcycle rear brake foot pedal). Next, the operator engages the locking mechanism by moving a locking lever 30 to a locked position. To release the locking mechanism, the operator merely moves the locking lever 30 to its unlocked position, allowing the hydraulic fluid to flow back and releasing the pressure on the brake.

Figure 5:
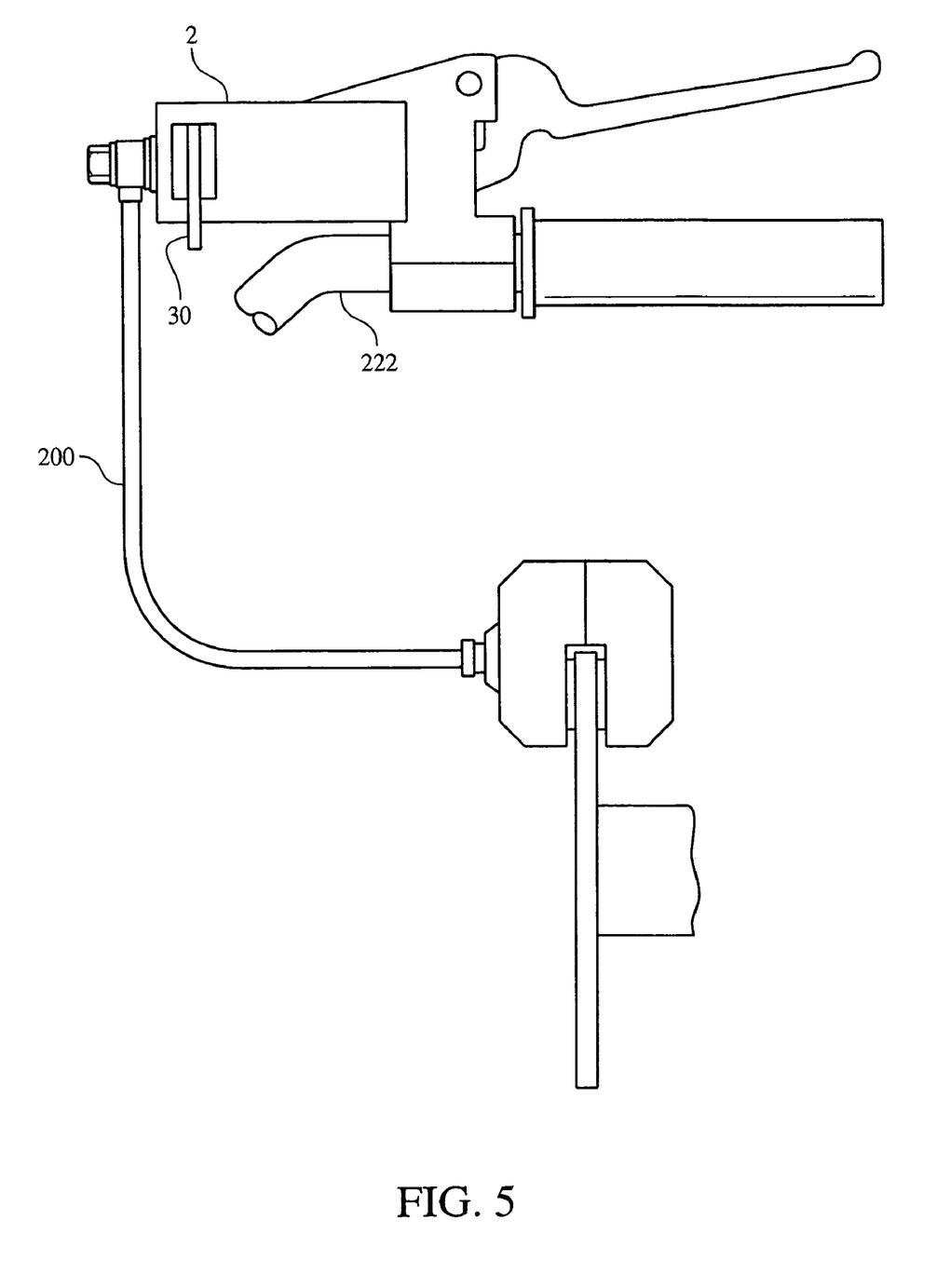
FIG. 5 shows the locking master cylinder assembly of FIG. 4 mounted on a vehicle handlebar.
Figure 7:
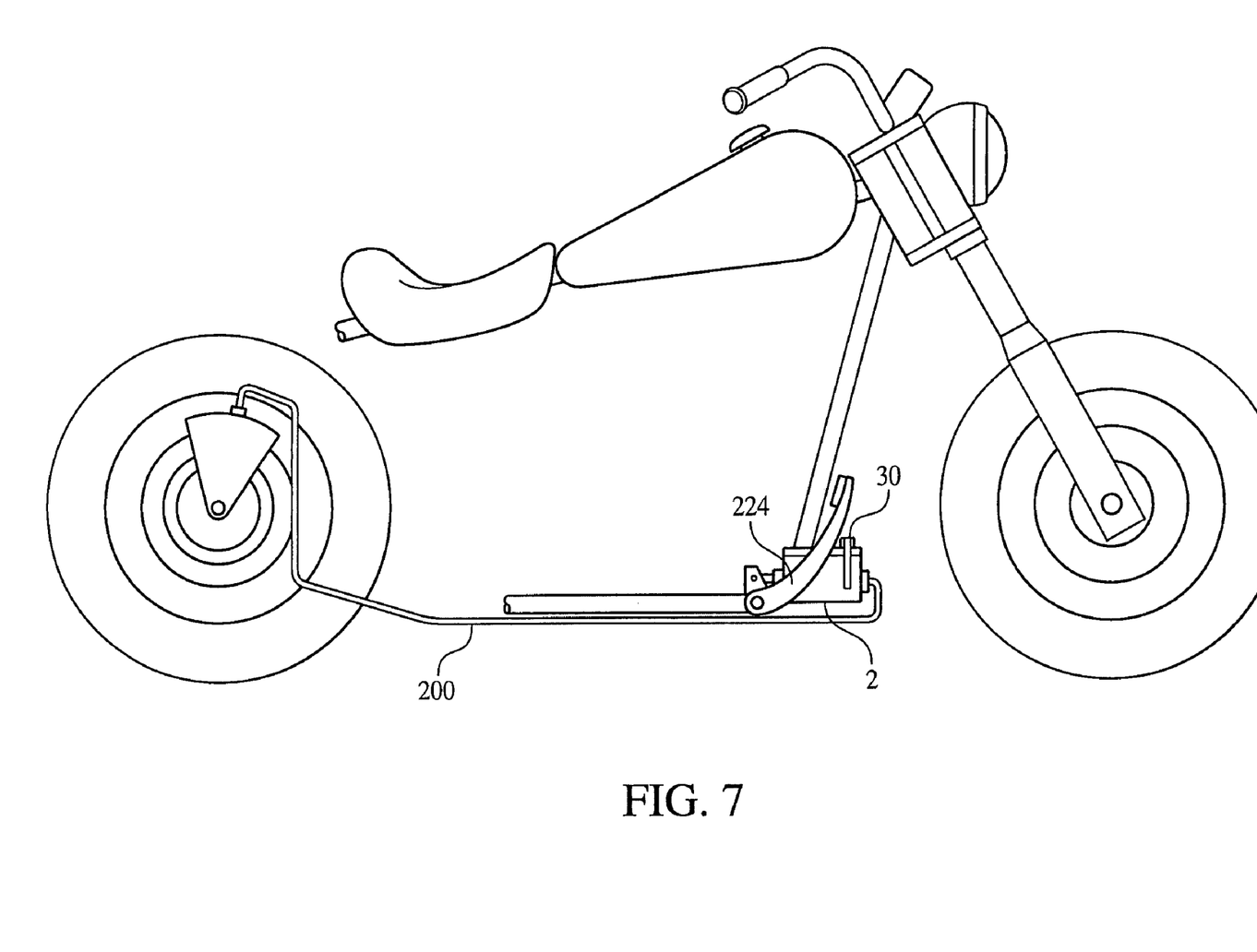
FIG. 7 shows the locking master cylinder assembly of FIG. 4 coupled to a foot pedal for operating a motorcycle rear brake.

Locking lever 30 for locking master cylinder assembly 2 may be a hand-operated lever as shown in FIGS. 4 and 5, or alternatively a foot-operated lever as shown in FIG. 7. As shown in FIG. 5, a locking master cylinder assembly 2 as described above may mounted to a vehicle handlebar 222, for example a motorcycle handlebar, wherein the locking master cylinder assembly 2 is operable to lock a front brake of the motorcycle. As shown in FIG. 7, a locking master cylinder assembly 2 as described above may be mounted such that first reciprocating piston 214 is coupled to a foot pedal 224 and is for operating a rear brake of the vehicle.

Figure 6:
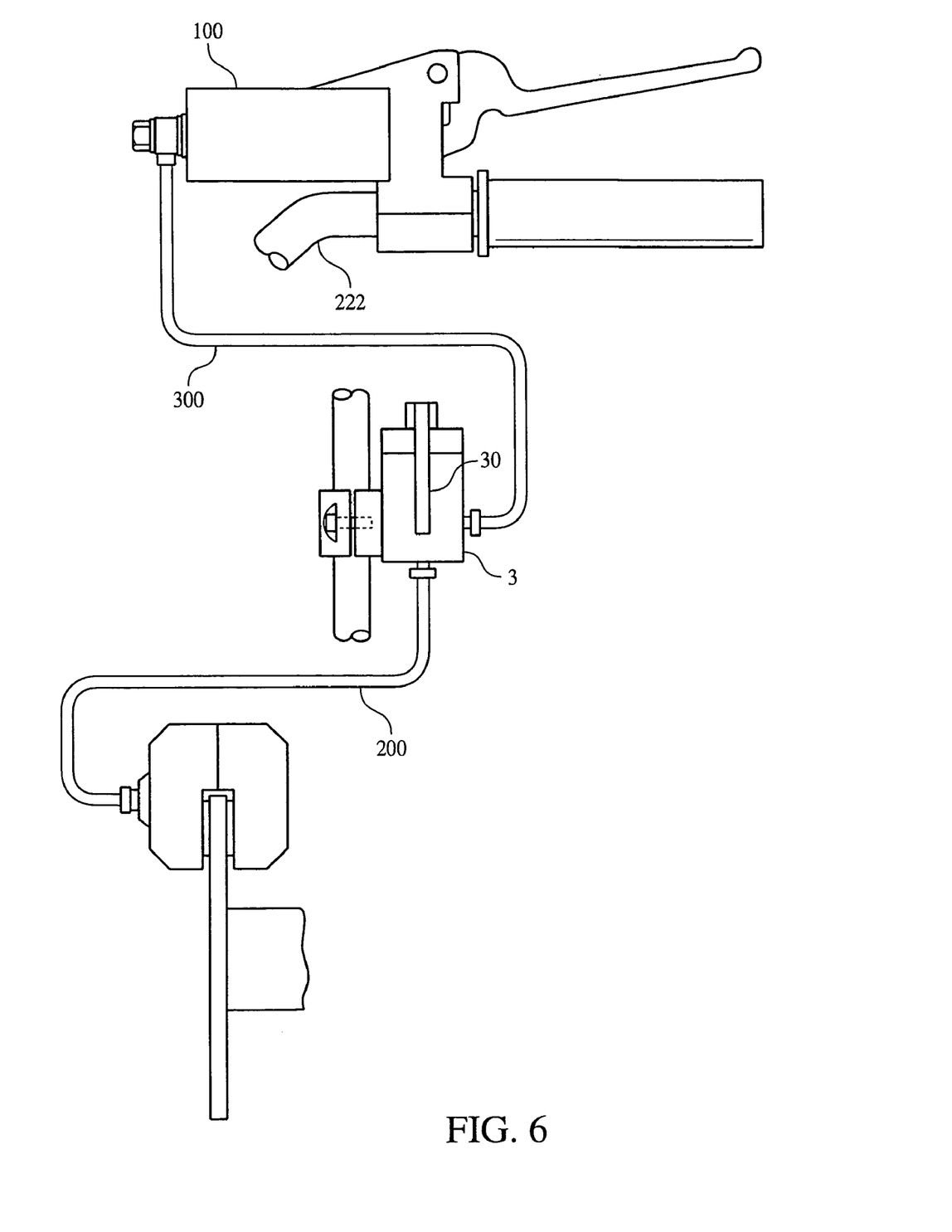
FIG. 6 shows a remote mounted locking mechanism for a hydraulic brake system according to another embodiment of the invention.

FIG. 6 shows a remote mounted locking mechanism 3 for a hydraulic brake system according to another embodiment of the invention. Remote mounted locking mechanism 3 is similar to the locking mechanism shown FIGS. 1-3 and described above, however rather than being secured to the master cylinder 100, the locking mechanism 3 is mounted remote from the master cylinder 100 and between a first brake line 300 coupled to master cylinder 100 and a second brake line 200 coupled to a vehicle brake. Remote mounted locking mechanism 3 may be mounted to a vehicle's frame or handlebar. For example, remote mounted locking mechanism 3 may be clamped to a motorcycle frame or bolted thereto using a bracket, tab or the like.

Locking mechanism 3 includes a housing having an internal bore, an inlet port in fluid communication with the internal bore and the first brake line 300, and an outlet port in fluid communication with the internal bore and a second brake line 200 for actuating the vehicle brake. A lid may be disposed on the housing and a reciprocating piston is movable within the internal bore. A locking lever 30 is coupled to the reciprocating piston for actuating the reciprocating piston. Preferably the locking lever is pivotally coupled to the housing lid. A portion of the locking lever may be in abutting contact with the reciprocating piston.

Locking lever 30 is moveable between a first, or unlocked position, wherein the hydraulic fluid can flow freely between the first brake line 300 and the second brake line 200 for engaging and disengaging the vehicle brake and a second, or locked position, wherein the hydraulic fluid is prevented from flowing between the first brake line 300 and the second brake line 200 for maintaining the vehicle brake in an engaged state. Operation of remote mounted locking mechanism 3 is as described for the embodiments discussed above.

Accordingly, while several embodiments of the present invention have been shown and described, it is obvious that many changes and modifications may be made thereunto without departing from the spirit and scope of the invention.

What is claimed is:

1. A locking mechanism for a motorcycle master cylinder containing hydraulic fluid and having an opening adapted for securing a brake line for operating a front brake of the motorcycle, the locking mechanism comprising:
    a) a housing having an internal bore, an inlet port in fluid communication with said internal bore, a passage in fluid communication with said inlet port, and an outlet port in fluid communication with said internal bore and with the brake line;
    b) a reciprocating piston movable within said internal bore;
    c) a ring-type seal coupled to said reciprocating piston for sealing said internal bore and preventing a flow of the hydraulic fluid between said inlet port and said outlet port;
    d) a locking lever coupled to said reciprocating piston for actuating said reciprocating piston; and
    e) a fastener for securing said housing directly to the motorcycle master cylinder, said fastener secured in the opening in the motorcycle master cylinder adapted for securing the brake line, said fastener having an internal fluid passage for providing fluid communication between said passage and the master cylinder;
    wherein said locking lever is moveable between a first position, wherein the hydraulic fluid can flow freely between the motorcycle master cylinder and the brake line for engaging and disengaging the front brake and a second position, wherein the hydraulic fluid is prevented from returning to the motorcycle master cylinder for maintaining the front brake in an engaged state.

2. The locking mechanism according to claim 1, wherein said fastener comprises a banjo bolt.

3. The locking mechanism according to claim 1, wherein said locking lever further comprises a rounded camming surface portion, a flattened surface portion and a projecting tab for retaining said locking lever in said second position.

4. The locking mechanism according to claim 1, further comprising a lid disposed on said housing, wherein said locking lever is pivotally coupled to said lid.

5. The locking mechanism according to claim 4, further comprising an arrangement for securing said lid and said locking lever in a plurality of orientations wherein said lid is secured to said housing with a plurality of fasteners and wherein said housing has a plurality of openings for receiving said fasteners.

6. The locking mechanism according to claim 1, wherein said motorcycle master cylinder is mounted on a motorcycle handlebar.

7. A locking motorcycle master cylinder assembly comprising:
   a) a motorcycle master cylinder containing hydraulic fluid and having an opening adapted for securing a brake line for operating a motorcycle front brake; and
   b) a locking mechanism comprising:
      i) a housing having an internal bore, an inlet port in fluid communication with said internal bore, a passage in fluid communication with said inlet port, and an outlet port in fluid communication with said internal bore and with the brake line;
      ii) a reciprocating piston movable within said internal bore;
      iii) a ring-type seal coupled to said reciprocating piston for sealing said internal bore and preventing a flow of the hydraulic fluid between said inlet port and said outlet port;
      iv) a locking lever coupled to said reciprocating piston for actuating said reciprocating piston; and
      v) a fastener securing said housing directly to said motorcycle master cylinder, wherein said fastener is secured in the opening in said motorcycle master cylinder adapted for securing the brake line, and said fastener has an internal fluid passage for providing fluid communication between said passage and said motorcycle master cylinder;
   wherein said locking lever is moveable between a first position, wherein the hydraulic fluid can flow freely between said motorcycle master cylinder and the brake line for engaging and disengaging the motorcycle front brake and a second position, wherein the hydraulic fluid is prevented from returning to said motorcycle master cylinder for maintaining the motorcycle front brake in an engaged state.

* * * * *